United States Patent [19]

Dona et al.

[11] Patent Number: 5,161,901
[45] Date of Patent: Nov. 10, 1992

[54] SUPPORT DEVICE FOR A DRUM

[75] Inventors: Marinus J. J. Dona; Johannes M. M. Swinkels, both of Eindhoven, Netherlands

[73] Assignee: U.S. Philips Corporation, New York, N.Y.

[21] Appl. No.: 853,884

[22] Filed: Mar. 18, 1992

Related U.S. Application Data

[63] Continuation of Ser. No. 618,278, Nov. 26, 1990, abandoned.

[30] Foreign Application Priority Data

Apr. 27, 1990 [NL] Netherlands .................. 9001013

[51] Int. Cl.⁵ .................. F16C 23/04; F16C 27/02; B23B 5/00
[52] U.S. Cl. .................. 384/192; 82/168; 279/2.01; 384/215; 384/119
[58] Field of Search .......... 384/192, 202, 205, 215, 384/416-419, 100, 103, 107, 119; 82/168, 169; 269/48.1; 279/2 R, 2 A

[56] References Cited

U.S. PATENT DOCUMENTS

| | | | |
|---|---|---|---|
| 2,684,877 | 7/1954 | Schneider | 384/202 |
| 3,055,083 | 9/1962 | Stöbi | 384/419 X |
| 3,159,435 | 12/1964 | Schlick | 384/215 |
| 3,170,736 | 2/1965 | Wright | 384/215 |
| 3,185,532 | 5/1965 | Loch | 384/215 |
| 3,604,765 | 9/1971 | Babcock | 384/192 |
| 4,033,497 | 7/1977 | Przygocki | 384/419 X |
| 4,422,780 | 12/1983 | Glaeser | 384/215 |
| 4,955,937 | 9/1990 | Dona et al. | 82/1.11 |

Primary Examiner—Thomas R. Hannon
Attorney, Agent, or Firm—Brian J. Wieghaus

[57] ABSTRACT

A support device for a drum (1) which is provided with two journals (57, 59) projecting from the drum on either side of the drum, whose centerlines (25, 27) substantially coincide with the centerline (9) of the drum. Each of the two journals (57, 59) is journalled around an axis of rotation (61) in a bearing bush (63, 65) which is attached to a frame (67) by a ring-shaped membrane (69) positioned in a plane transverse to the axis of rotation (61). Each of the two journals (57, 59) forms part of a shaft (17, 19) projecting into the drum (1), and attached to a shell (7) of the drum by a ring-shaped plate (11). An end of a portion of each shaft (17, 19) projecting into the drum (1) bears on adjustment devices (41, 43, 49) by which the relevant shaft (17, 19) with journal (57, 59) can be swivelled relative to the centerline (9) of the drum (1). In particular, such a support device is used for a drum (1) which serves as a rotating carrier for a plate-shaped workpiece which is to be machined accurately by a cutting tool, such as, for example, a master for the production of projection television screens.

18 Claims, 2 Drawing Sheets

SUPPORT DEVICE FOR A DRUM

This is a continuation of application Ser. No. 618,278, filed Nov. 26, 1990 now abandoned.

CROSS-REFERENCE TO RELATED APPLICATION

This application relates to U.S. application Ser. No. 07/619,170, filed simultaneously herewith on Nov. 26, 1990, entitled "Machine Tool With Movable Positioning Device" which discloses and claims a machine tool having a positioning device mounted on a carrier which is coupled to the machine tool frame by a static fluid bearing, and to U.S. application Ser. No. 07/619,169 also filed simultaneously herewith entitled "Positioning Device Having a Static Fluid Bearings" which discloses and claims a positioning device for a tool of a machine tool.

BACKGROUND OF THE INVENTION

The invention relates to a support device for a drum which is provided with two journals whose centrelines coincide substantially with the centreline of the drum, which journals project from the drum on either side of the drum and each have their bearing in a bush attached to a frame so that they are rotatable about a common axis of rotation which substantially coincides with the said centrelines.

The wish in many practical situations is for a drum to be able to rotate around its centreline within very narrow tolerance limits. This is the case, for example, when the drum serves to clamp a flexible plate-shaped workpiece which, after being clamped, is machined by means of a feed motion of a tool holder carrying a tool fastened to it in a radial direction relative to the centreline of the drum and by means of a rotational movement of the drum. If the workpiece is clamped around a drum with a high resistance to bending, a rigid cylindrical body is obtained which renders an accurate machining of the workpiece possible. In particular, so-called masters for the manufacture of projection screens in the form of so-called linear Fresnel lenses for projection television are manufactured in this way. In this process, any deviations in the circular movement made by a point on the outer circumference of the drum must remain below one micrometer.

If such a requirement is to be met, it is impossible in general to use ball bearings, as is the case in conventional supports, but it is necessary to use radial fluid bearings which can operate between an outer circumference of a journal and an inner circumference of a bearing bush attached to the frame with small gaps of the order of approximately 12 $\mu$m. In addition, the use of radial fluid bearings, in contrast to the conventional ball bearings, makes it possible to accommodate any expansion differences in axial direction between the drum and the frame in a simple way in that the journals can be axially shifted in the bearing bushes.

Now a first problem which arises here, especially in the case of a support device having a relatively long drum, is that the bushes surrounding the journals must be aligned relative to one another with great accuracy so that the centrelines of the said bushes coincide to within a very narrow tolerance and the two journals can be positioned in the bushes with a degree of clearance sufficient for a correct journalling action. In addition, a second problem with such long drums is that the centrelines of the two journals do not coincide. Generally, the axis of rotation about which the drum is rotatable does not coincide with the centreline of the drum in such a case, so that the rotational movement of the drum is inaccurate and the said axis of rotation also fails to coincide with the centrelines of the journals, so that also the rotational movement of the journals relative to the bearing bushes is incorrect, which may lead to an incorrect journalling action.

SUMMARY OF THE INVENTION

The invention has for its object to provide a support device in which the problems mentioned are avoided.

The support device according to the invention is for this purpose characterized in that each of the bushes is attached to the frame by means of a ring-shaped membrane which is situated in a plane transverse to the axis of rotation.

If the ring-shaped membranes are manufactured to a sufficient accuracy, the centreline of each of the two bushes will go through the centre of the relevant membrane and each of the two bushes can be swivelled through relatively small angles relative to the centreline of the relevant membrane about a pivot which coincides with the said centre of the membrane. If an ideally dimensioned drum, in which the centrelines of the journals coincide with the drum centreline, rotates about the axis of rotation in the said support device, each of the two bushes will be swivelled about its pivot in such a way under the influence of the occuring journal forces that its centreline coincides substantially with the centreline of the drum. An automatic alignment of the bushes relative to the drum is obtained in this way.

A particular embodiment of a support device according to the invention which provides a substantially frictionless and very rigid journalling of the drum in a direction parallel to the axis of rotation is characterized in that one of the two journals is journalled in a direction parallel to the axis of rotation by means of an axially operating fluid bearing which comprises a part connected to the frame through an elastic connection which operates as a ball joint, a centre of the elastic connection being situated in the centre of the ring-shaped membrane by means of which the bearing bush surrounding the relevant journal is attached to the frame. It is achieved by the use of the said elastic connection that the part of the axial fluid bearing connected to the frame can swivel about a point which substantially coincides with the pivot formed by the ring-shaped membrane about which the bearing bush, the journal guided therein and the part of the axial fluid bearing attached to the journal can swivel. Thus the entire axial fluid bearing can follow an adjustment movement of the bearing bush, so that a correct operation of the axial fluid bearing remains possible.

A further embodiment of a support device according to the invention, which provides a compact attached of the axial fluid bearing to the frame, is characterized in that the axially operating fluid bearing comprises a tube which projects into the journal, which is attached to an end of a rod attached to the frame and having a centreline substantially coinciding with the axis of rotation, and which surrounds the said rod substantially concentrically, while the rod has a portion of reduced diameter constituting the said elastic connection around the point of intersection of the centreline of the rod and the plane through the ring-shaped membrane. A further object achieved by this is that the axial fluid bearing is situated outside the relevant journal, so that the dimensions of the bearing necessary for a correct bearing operation are not restricted by the small space available inside the relevant journal.

A still further embodiment of a support device according to the invention is characterized in that each of the two journals forms part of a shaft which is attached to the drum by means of a ring-shaped plate situated in a plane transverse to the centreline of the drum, a portion of each shaft which projects into the drum being in engagement with adjustment means by which the relevant shaft can be swivelled relative to the centreline of the drum about a swivelling point which substantially coincides with a point of intersection of the centreline of the drum and the plane through the ring-shaped plate by means of which the relevant shaft is attached to the drum. This achieves that the two shafts with the accompanying journals can be so swivelled about the said swivelling points by the said adjustment means that the centrelines of the shafts coincide. If the ring-shaped plates are manufactured so accurately that the swivelling points lie on the centreline of the drum and the centreline of each of the shafts passes through the swivelling point of the ring-shaped plate attached to the relevant shaft, the centrelines of the two shafts and journals will also coincide with the drum centreline after a correct adjustment. Thus an accurate rotary movement of the drum and of the journals inserted in the bearing bushes is obtained.

A particular embodiment of a support device according to the invention comprising adjustment means by which the shafts can be swivelled in any desired direction relative to the drum centreline in a simple manner is characterized in that an end of the portion of each shaft projecting into the drum is situated with clearance in a support bush attached to the drum and is movable relative to the support bush by means of adjustment bolts screwed into the support bush and bearing on the end of the shaft.

A further embodiment of a support device according to the invention, which provides an effective, accurate, and easily implemented attachment of a shaft to the drum, is characterized in that the drum is composed of drum parts which fit into one another, at least one of the ring-shaped plates by means of which the shafts are attached to the drum being formed by a bottom, or transverse wall, of one of the drum parts. The said composition of the drum from different drum parts moreover leads to a relatively high rigidity of the drum, while the drum length can be adapted to the dimensions of the workpiece to be processed by the addition or removal of one or several drum parts.

BRIEF DESCRIPTION OF THE DRAWINGS

The invention will be explained in more detail with reference to the drawing in which.

DESCRIPTION OF THE PREFERRED EMBODIMENT

Figure 1:
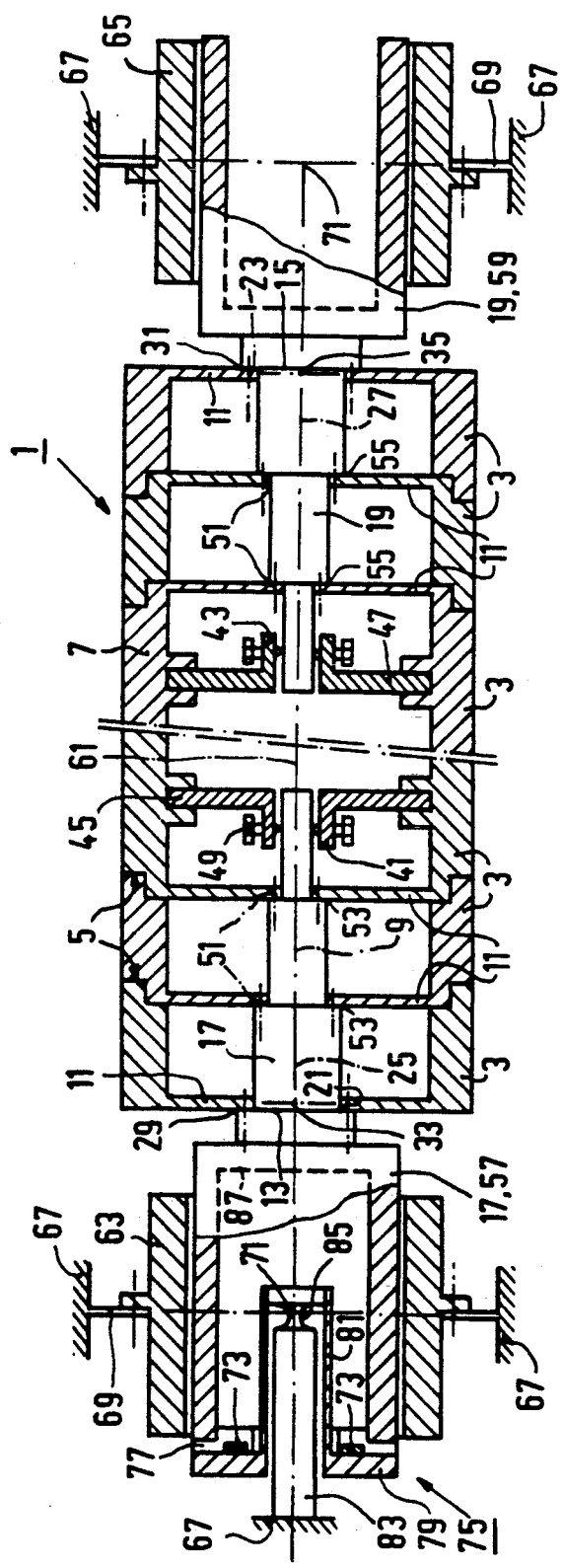
FIG. 1 shows a longitudinal section of an embodiment of a support device according to the invention.
Figure 2:
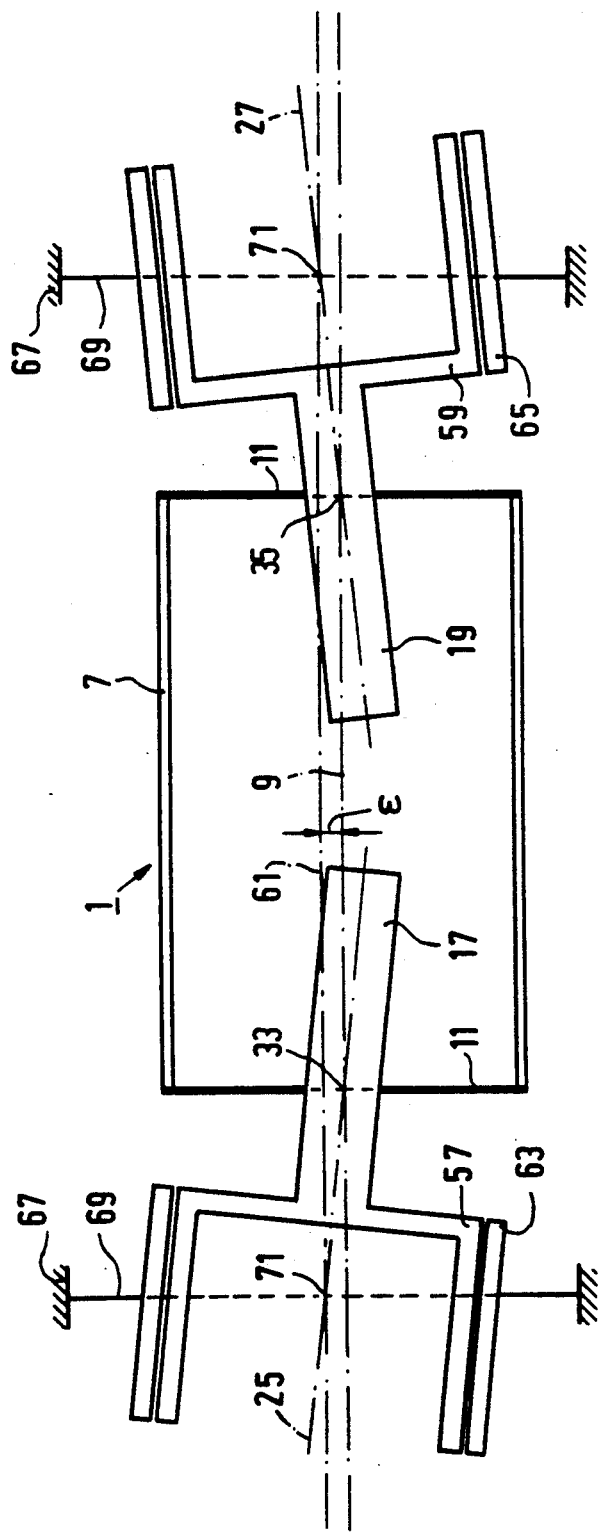
FIG. 2 shows a diagrammatic longitudinal section of this embodiment.

The embodiment of the support device shown in FIG. 1 comprises a drum 1 of aluminium built up from a number of cup-shaped drum parts 3 which fit into one another. The drum parts 3 have a stepped profile 5, so that the complete drum 1 with a shell 7 is formed by drum parts 3 fitting together. The centrelines of the cup-shaped drum parts 3 coincide with a centreline 9 of the complete drum 1. Each of the drum parts 3 comprises a bottom 11 in the shape of a ring-shaped plate which is situated in a plane transverse to the centreline 9 of the drum 1. Viewed in relation to a plane transverse to the centreline 9 through the centre of the drum 1, the drum parts 3 situated to the left and to the right of this plane in FIG. 1 are arranged with their bottoms 11 facing away from one another. The bottoms 11 of the two outermost drum parts 3 carry shaft portions 13 and 15 of stepped shafts 17 and 19, fastened by means of diagrammatically indicated screw connections 21 and 23, respectively. As is shown in FIG. 2, the shafts 17 and 19 have respective centrelines 25 and 27. The two screw connections 21 and 23 each comprise a rim of screws applied concentrically around the centrelines 25 and 27, screw holes being present at regular distances from one another in collars 29 and 31 of the stepped shafts 17 and 19. The bottoms 11 of the relevant drum parts 3 are elastically deformable in axial direction, so that the two shafts 17 and 19 can swivel through small angles relative to the centreline 9 of the drum 1 about swivelling points 33 and 35, respectively. The bottoms 11 and the screw connections 21 and 23 are manufactured to such an accuracy that the swivelling points 33 and 35 lie on the centrelines 25 and 27 of the shafts 17 and 19 and coincide with the points of intersection of the centreline 9 of the drum 1 with centre planes through the bottoms 11 of the respective drum parts 3 attached to collars 29 and 31.

The ends of the shafts 17 and 19 situated inside the drum 1, as can be seen in FIG. 1, are surrounded with some clearance and practically concentrically by bushes 41 and 43, respectively, which are attached to the shell 7 of drum 1 by means of rigid ring-shaped plates 45 and 47. Each of the bushes 41 and 43 is provided with screw holes in a plane transverse to the centreline 9 of the drum 1, which holes are regularly spaced viewed in circumferential direction of the bushes 41 and 43 and into which adjustment bolts 49 are screwed whose ends bear on the outer circumference of the end of the shaft 17, 19 surrounded by the relevant bush. The two shafts 17 and 19 can be swivelled about the respective swivelling points 33 and 35 into any desired direction relative to the centreline 9 of the drum 1 by means of the adjustments bolts 49. It is possible in this way to align the shafts 17 and 19 in such a way relative to one another that the two centrelines 25 and 27 of the shafts coincide with the centreline 9 of the drum 1.

After the shafts 17 and 19 have been aligned in the manner described, they can each be locked in the accurately set position obtained by means of screw connections 51 at the bottoms 11 of those drum parts 3 which are situated between the plates 45 and 47, respectively, and the outermost drum parts. The screw connections 51 each comprise a regular rim of screws applied concentrically about the centreline 9 of the drum 1, regularly spaced screw holes being present in collars 53 and 55 of the shafts 17 and 19 close to the points of intersection of each of the centrelines 25 and 27 of the shafts 17, 19 and a centre plane through the bottoms 11 of the drum parts 3 attached to the respective collars 53 and 55. The attachment of the bottoms 11 to the shafts 17 and 19 in the manner described also increases the rigidity of the drum 1, and thus the accuracy of the support device.

As is further shown in FIG. 1, the two shafts 17 and 19 are provided at their ends projecting from the drum 1 with respective steel journals 57 and 59 whose centrelines coincide with the centrelines 25 and 27 of the shafts 17, 19, respectively. The journals 57 and 59 are journalled around an axis of rotation 61 which substantially coincides with centreline 9 in a bearing bush 63 and a bearing bush 65, respectively, each forming part of a radially operating static fluid bearing, which is known per se and is not shown in any detail, for the journals 57 and 59, respectively.

Each of the bearing bushes 63, 65 is attached to a frame 67 of the support device by means of a ring-shaped membrane 69 which is situated in a plane transverse to the axis of rotation 61 and which is rigid in radial direction relative to the axis of rotation 61. The ring-shaped membranes 69, which are elastically deformable in axial direction, as are the bottoms 11 of the outermost drum parts 3, are manufactured to such an accuracy that each of the bearing bushes 63, 65 can swivel through relatively small angles relative to the centreline of the membrane 69 attached to the relevant bearing bush 63, 65 about a pivot 71 which coincides substantially with the centre of the relevant membrane 63 and which is situated on the centreline of the relevant bearing bush. It is achieved in this way that the two bearing bushes 63, 65 can be so swivelled under the influence of forces exerted by the two radial static fluid bearings that the centreline of each bearing bush 63, 65 in all circumstances substantially coincides with the centreline 25, 27 of the journal 57, 59 supported by the relevant bearing bush 63, 65. Under the influence of the said bearing forces, the two bearing bushes 63 and 65 are self-adjusting, so that a clearance necessary for a correct bearing operation is always present between the journals 57, 59 and the bearing bushes 63, 65. If the shafts 17 and 19 are ideally aligned, the centrelines 25 and 27 of the shafts 17, 19 coinciding with the centreline 9 of the drum 1, the axis of rotation 61 substantially coincides with the said centrelines 9, 25 and 27, and an exact rotational movement of the drum is obtained. If the centrelines 25 and 27 of the shafts 17, 19 do not exactly coincide with the centreline 9 of the drum 1, the axis of rotation 61 generally passes through the two pivots 71 of the membranes 69, and there is an eccentricity of the centreline 9 relative to the axis of rotation 61. This situation is shown in an exaggerated form in FIG. 2. Since the centreline 9 and the two centrelines 25 and 27 do not coincide with the axis of rotation 61 now, the rotational movement of the drum 1 and of the journals 57 and 59 is slightly inaccurate. Thanks to the swivelling suspension of the two bearing bushes 63 and 65, these bearing bushes 63, 65 are capable of following the inaccurate rotational movement of the journals 57, 59, so that a correct bearing operation remains possible.

The drum 1 is journalled in a direction parallel to the axis of rotation 61 by means of an axially operating static fluid bearing 75 pre-tensioned by permanent magnets 73 of a type which is known per se and which is not shown in FIG. 1. The static fluid bearing 75 is situated near an end of the journal 57 and comprises, as is shown in FIG. 1, a ring-shaped part 77, which is attached to journal 57 concentrically around centreline 25, and a ring-shaped part 79, which is also positioned concentrically around centreline 25 and is attached to the frame 67. A tube 81 is attached to the ring-shaped part 79 of the axial fluid bearing 75 and projects into the journal 57, while it is connected to a rod 83 attached to the frame 67 near its end. The centreline of rod 83 coincides substantially with the axis of rotation 61, while the tube 81 surrounds the rod 83 substantially concentrically. The rod 83 comprises a portion of reduced diameter 85 which is situated around a point of intersection of the centerline of the rod 83 and the plane through the ring-shaped membrane 69 by which the bearing bush 63 of journal 57 is attached to the frame 67. The portion of reduced diameter 85 forms an elastically deformable connection between the axially operating static fluid bearing 75 and the frame 67, acting as a ball joint, so that the ring-shaped part 79 of the fluid bearing 75 together with the tube 81 can swivel through small angles about a point which lies in the centre of the portion of reduced diameter 85 and coincides substantially with the centre of the ring-shaped membrane 69. It is achieved in this way that the two ring-shaped parts 77 and 79 of the fluid bearing 75 can swivel about the same point, so that the entire fluid bearing 75 can follow an adjustment movement of the bearing bush 63 and a correct operation of the fluid bearing 75 thus remains possible.

It should be noted that the use of a fastening construction of the axial static fluid bearing 75 to the frame 67 as described above means that the fluid bearing 75 is mounted outside the journal 57. In principle, the fluid bearing 75 may also be mounted inside the journal 57 by means of a construction which is in itself simpler, and may, for example, be attached to the journal 57 at the flat wall 87 of the journal 57. Whether such a simpler construction is possible depends on the available space inside the journal 57. The size of this space is determined by, among other factors, the necessary bearing force of the radial and axial fluid bearings.

It should further be noted that the term ring-shaped membranes 69 is understood to refer to thin, ring-shaped plates which are so rigid in a radial direction relative to the axis of rotation 61 and which have such an elastic deformability in an axial direction relative to the axis of rotation 61 that the swivelling movement of the bearing bushes 63, 65 referred to above is possible. Instead of the ring-shaped membranes 69 used here, with which the bearing bushes 63, 65 are attached to the frame 67, or instead of the ring-shaped plates 11 of the outermost drum parts 3 used here, with which the shafts 17, 19 are attached to the drum 1, other fastening means may alternatively be used, which means may be built up from, for example, spoke-shaped parts provided in radial direction in a plane transverse to the axis of rotation 61 and elastically deformable in a direction perpendicular to this plane, or from thin, ring-shaped plates provided with windows.

As was mentioned above, an inaccurate rotary movement of the journals 57 and 59 caused by imperfect coincidence of the centrelines 25 and 27 of the shafts 17, 19 can be followed by the bearing bushes 63 and 65. The degree to which this is possible is determined by, among other factors, the dimensions of the two membranes 69. The adjustment means by which the shafts 17 and 19 can be swivelled relative to the centreline 9 of the drum 1 are accordingly unnecessary in principle, provided sufficiently large membranes 69 can be used, which is sometimes impossible or impracticable in view of the admissible dimensions of the support device, or in the case in which the centrelines 25, 27 of the shafts 17, 19 are capable of coinciding to within very narrow tolerances without adjustment means, which is difficult to achieve if the dimensions of the drum 1 are large.

It should also be noted that, instead of the static fluid bearings, dynamic fluid bearings may alternatively be used, which bearings are provided with known means for enabling starting and stopping of a rotational movement of the drum 1 without damage to bearing surfaces.

Finally, it is noted that each of the ring-shaped plates 45, 47 with which the bushes 41, 43 are attached to the drum 1 may also be formed by a bottom 11 of one of the drum parts 3.

We claim:

1. A support device having a frame, a pair of bearing bushes attached to the frame, a drum having a centerline, a pair of journals whose centerlines coincide substantially with the centerline of said drum, said journals projecting from said drum on either side of said drum each into a respective said bush so that said journals are rotatable about a common axis of rotation which substantially coincides with the said centerlines, wherein the improvement comprises:

a ring-shaped membrane situated in a plane transverse to the axis of rotation attaches each bush to said frame, said ring-shaped membrane being rigid in the transverse direction and elastically deformable in the axial direction to allow swivelling of each bush about a center of its respective ring-shaped member;

an axial fluid bearing rotatably axially supports a said journal; and elastic connection means for elastically connecting said axial fluid bearing to said frame at the center of the respective ring-shaped membrane to allow swivelling of said fluid bearing about said center.

2. A support device as claimed in claim 1, characterized in that a rod is attached to said frame and has a centerline substantially coinciding with the axis of rotation of said drum, said axial fluid bearing comprises a tube which projects into a respective journal, is attached to an end of said rod and surrounds said rod substantially concentrically, and said elastic connection means is comprised by said rod having a portion of reduced diameter around the point of intersection of the centerline of said rod and the plane through said ring-shaped membrane.

3. A support device as claimed in claim 2, characterized in that each of said two journals comprises a shaft projecting into said drum, and said drum comprises a pair of ring-shaped plates, each situated in a plane transverse to the centerline of the drum, which connect said shafts to said drum, and adjustment means engaging each shaft by which the relevant shaft can be swivelled relative to the centerline of said drum about a swivelling point which substantially coincides with a point of intersection of the centerline of the drum and said plane through said ring-shaped plate which attaches the relevant shaft to said drum.

4. A support device as claimed in claim 3, characterized in that said adjustment means is comprised of an internal support bush within said drum having a plurality of adjustment bolts, an end portion of a respective shaft projecting into said drum is situated with clearance in said support bush and is movable relative to the support bush, and said adjustment bolts are screwable into said support bush and said shaft to permit swivelling adjustment of said shaft with respect to said drum.

5. A support device as claimed in claim 4, characterized in that said drum is comprised of a plurality of drum parts which fit into one another, and a said ring-shaped plate which attaches said shafts to the drum is formed by a transverse wall of one of said drum parts.

6. A support device as claimed in claim 3, characterized in that said drum is comprised of a plurality of drum parts which fit into one another, and a said ring-shaped plate which attaches said shafts to said drum is formed by a transverse wall of one of said drum parts.

7. A support device as claimed in claim 1, characterized in that each of said two journals comprises a shaft projecting into said drum, and said drum comprises a pair of ring-shaped plates each situated in a plane transverse to said centreline of said drum, which connect said shafts to said drum, and adjustment means engaging each shaft by which the relevant shaft can be swivelled relative to said centreline of said drum about a swivelling point which substantially coincides with a point of intersection of the centreline of said drum and the plane through said ring-shaped plate which attaches the relevant shaft to said drum.

8. A support device as claimed in claim 7, characterized in that said adjustment means comprises an internal support bush within said drum having a plurality of adjustment bolts, an end portion of a respective shaft projecting into said drum is situated with clearance in said support bush and is movable relative to said support bush, and said adjustment bolts are screwable into said support bush and said shaft to permit swivelling adjustment of said shaft with respect to said drum.

9. A support device as claimed in claim 8, characterized in that said drum is comprised of a plurality of drum parts which fit into one another, and a said ring-shaped plate which attaches said shafts to said drum is formed by a transverse wall of one of said drum parts.

10. A support device as claimed in claim 7, characterized in that said drum is comprised of a plurality of drum parts which fit into one another, and a said ring-shaped plate which attaches said shafts to said drum is formed by a transverse wall of one of said drum parts.

11. A support device for a rotatable object rotatable about a centerline, said device having a frame, a pair of bearing bushes attached to the frame, and a pair of journals whose centerlines coincide substantially with the centerline of the object, said journals projecting from said object on either side thereof each into a respective said bush so that said journals are rotatable about a common axis of rotation which substantially coincides with the said centerlines, wherein the improvement comprises:

a flexible ring-shaped membrane situated in a plane transverse to the axis of rotation attaches each bush to said frame, said membrane being rigid in said transverse direction and elastically deformable in the axial direction to permit swivelling of each bush about a center of its respective membrane;

an axial fluid bearing rotatably axially supports a said journal; and elastic connection means for elastically connecting said axial fluid bearing to said frame to allow swivelling of said axial bearing about the center of the respective ring-shaped membrane.

12. A support device as claimed in claim 11, characterized in that a rod is attached to said frame and has a centreline substantially coinciding with the axis of rotation of the rotatable object, said axial fluid bearing comprises a tube which projects into the journal, is attached to an end of said rod and surrounds said rod substantially concentrically, and said elastic connection means is comprised by said rod having a portion of reduced diameter around the point of intersection of the centreline of said rod and the plane through said ring-shaped membrane.

13. A support device according to claim 12, wherein each of said two journals comprises a shaft projecting into said object and, said device further comprises a pair of ring-shaped plates, each situated in a plane transverse to the centerline of said object for connecting said shafts to said object, and adjustment means engaging each shaft by which the relevant shaft can be swivelled relative to the centerline of said object about a swivelling point which substantially coincides with a point of intersection of the centerline of said object and the plane through said ring-shaped plate which attaches the relevant shaft to said object.

14. A support device according to claim 11, wherein each of said two journals comprises a shaft projecting into said object and, said device further comprises a pair of ring-shaped plates, each situated in a plane transverse to the centerline of said object for connecting said shafts to said object, and adjustment means engaging each shaft by which the relevant shaft can be swivelled relative to the centerline of said object about a swivelling point which substantially coincides with a point of intersection of the centerline of said object and the plane through said ring-shaped plate which attaches the relevant shaft to said object.

15. A support device having a frame, a pair of bearing bushes attached to said frame, a drum having a centerline, and a pair of journals whose centerlines coincide substantially with the centerline of said drum, said journals projecting from said drum on either side thereof into a respective said bush so that said journals are rotatable about a common axis of rotation which substantially coincides with the said centerlines, wherein the improvement comprises:

a ring-shaped membrane situated in a plane transverse to the axis of rotation attaches each bush to said frame, said membrane being rigid in said transverse direction and elastically deformable in the axial direction to permit swivelling of each bush about a center of its respective ring-shaped membrane;

each of said two journals comprises a shaft projecting into said drum; and said drum comprises a pair of ring-shaped plates, each situated in a plane transverse to the centerline of the drum, which connect said shafts to said drum, and adjustment means engaging each shaft by which the relevant shaft can be swivelled relative to the centerline of said drum about a swivelling point which substantially coincides with a point of intersection of the centerline of said drum and the plane through said ring-shaped plate which attaches the relevant shaft to said drum.

16. A support device as claimed in claim 15, characterized in that said adjustment means is comprised of an internal support bush within said drum having a plurality of adjustment bolts, an end portion of a respective shaft projecting into the drum is situated with clearance in said support bush and is movable relative to the support bush, and said adjustment bolts are screwable into the support bush and said shaft to permit swivelling adjustment of said shaft with respect to said drum.

17. A support device as claimed in claim 16, characterized in that said drum is comprised of a plurality of drum parts which fit into one another, and a said ring-shaped plate which attaches the shafts to the drum is formed by a transverse wall of one of said drum parts.

18. A support device as claimed in claim 15, characterized in that said drum is comprised of a plurality of drum parts which fit into one another, and a said ring-shaped plate which attaches the shafts to the drum is formed by a transverse wall of one of said drum parts.

* * * * *